June 23, 1959  R. F. KRUPP  2,891,570
PRESSURE REGULATING VALVE
Filed June 6, 1955
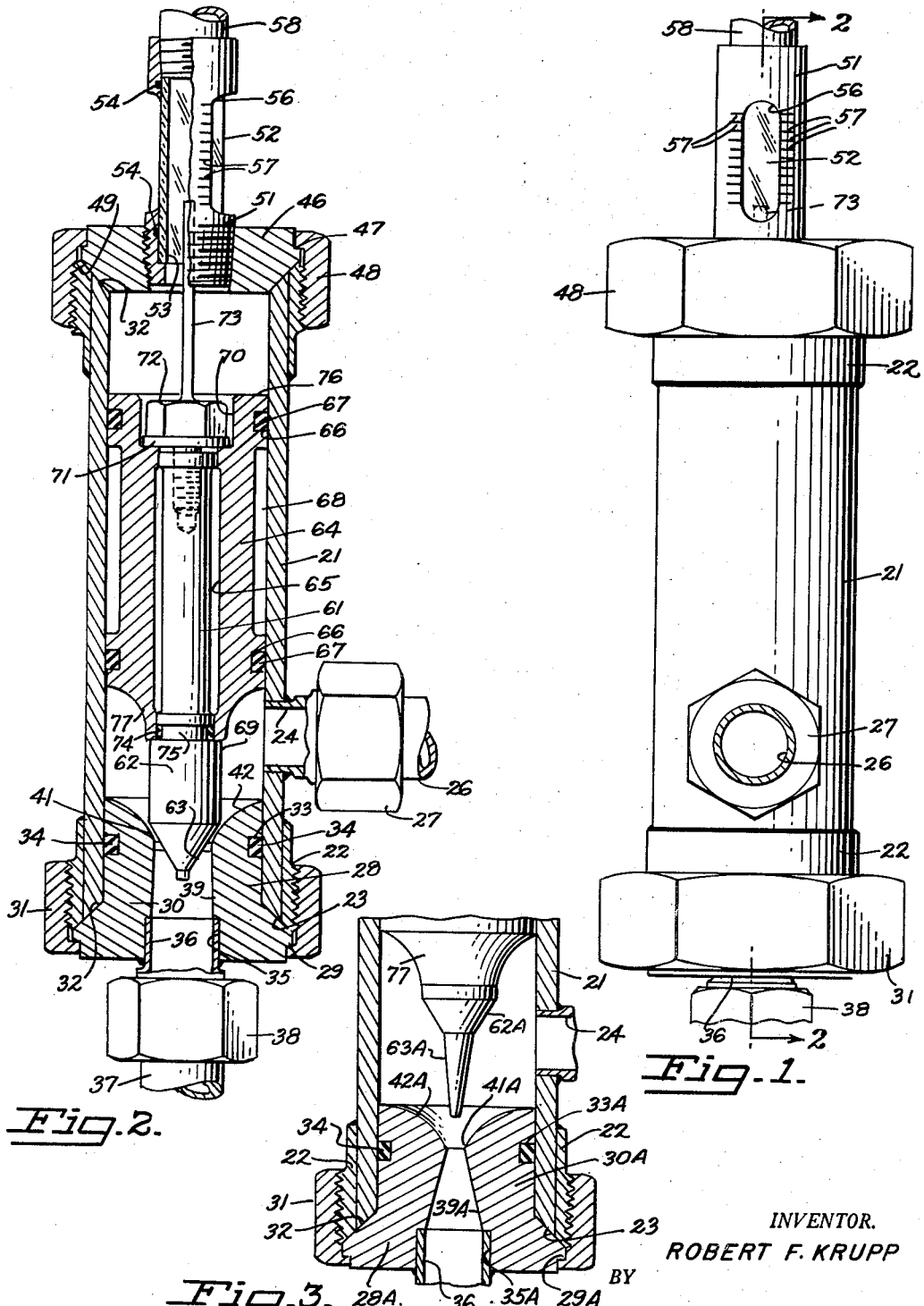
INVENTOR.
ROBERT F. KRUPP
BY
Townsend, Townsend and Hoppe
ATTORNEYS

United States Patent Office 2,891,570
Patented June 23, 1959

2,891,570

PRESSURE REGULATING VALVE

Robert F. Krupp, San Lorenzo, Calif., assignor to Gerber Products Company, Fremont, Mich., a corporation of Michigan Application June 6, 1955, Serial No. 513,360

4 Claims. (Cl. 137—509)

This invention relates to a new and improved pressure relief valve. More particularly, the invention relates to a valve which maintains a positive pressure in a line and is so constructed and operated that the valve opens only when the pressure in the line equals or exceeds a predetermined pressure, which pressure is adjustable. One of the particular features of the present invention is the construction which materially aids in sanitation in such installations as food processing lines. The valve is readily disassembled for the frequent cleaning which is required in handling food products and the like and is further readily reassembled.

Another feature of the invention is the fact that the valve is constructed of a standard sanitary pipe and sanitary pipe fittings, thereby materially reducing the cost of manufacture and eliminating the necessity of making castings. In addition, when it is necessary to grind surfaces of the valve, such operations can be conveniently conducted.

Still another feature of the invention is the fact that build-up of the product is eliminated, inasmuch as there are no dead spots, pockets or concavities where product passing through the valve may be trapped. Build-up of product materially affects the appearance, taste and other properties of product flowing through a line, particularly food products and the like.

Another feature of the invention is the provision of a smooth flow orifice through which the product passes, the approach to the orifice likewise being smooth, so that turbulent flow is eliminated and the capacity of the valve increased.

A still further feature of the invention is the fact that the valve seat and valve stem are replaceable and comprise change parts which vary the characteristics of the valve when conditions of the product or the rate of flow require.

A still further feature of the invention is the provision of a gauge which indicates to the attendant the amount of the valve opening at any given time.

Other objects of the present invention will become apparent upon reading the following specification and referring to the accompanying drawings in which similar characters of reference represent corresponding parts in each of the several views.

In the drawings:

Fig. 1 is a side elevation of the device;

Fig. 2 is a vertical section taken substantially along the line 2—2 of Fig. 1; and Fig. 3 is a fragmentary sectional view of the valve seat and stem showing a modified seat and stem for lesser volume of flow.

As shown in the accompanying drawings, the body 21 of the valve comprises a straight section of heavy wall sanitary pipe. A threaded ferrule 22 is welded to the ends of the body 21 at top and bottom. A 45° internal taper 23 is formed at the end of the body 21 to match ferrule 22. Spaced upwardly from the lower end of the body approximately one-quarter the length thereof is a product inlet nipple 24, which is welded to the body and which is machined flush with the inside diameter thereof. Nipple 24 is externally threaded and is attached to product inlet pipe 26 by means of union 27.

The bottom of the body 21 is closed off by bottom cap 28, the lower end of which is necked in and formed with a shoulder 29 which is engaged by nut 31 so that the cap 28 is drawn inside the body 21 as the nut 31 is tightened. The outer end of the cap 28 is formed with a 45° outwardly diverging taper which seats against the tapered end 23 of the body 21 and ferrule 22. Bottom cap 28 has an inwardly extending cylindrical plug extension 30 which fits inside the lower end of the body 21. Circumferential groove 33 in the plug 30 is fitted with a standard O-ring 34 which seals against the body 21 to form a sanitary seal.

The lower end of bottom cap 28 is provided with a product outlet nipple 36 which is exteriorly threaded and connected to product outlet pipe 37 by means of union 38. The inner end of nipple 36 is received in a counterbore 35 in the lower end of cap 28 and the inner diameter of nipple 36 merges with downwardly outwardly diverging throat 39. Adjacent the top of the plug 30 throat 39 reaches its minimum diameter at orifice 41 and above orifice 41 widens out in a valve seat 42 which has a rounded radius of curvature which widens outwardly to the body 21.

The upper end of body 21 is closed off by top cap 46 which has an exterior neck having a shoulder 47 against which bears nut 48. The inner end of cap 46 is formed with a 45° taper so that as the nut 48 is tightened, the cap 46 bears tightly against the tapered end 23 of body 21. Air inlet nipple 51 is threaded into the cap 46, nipple 51 being bored from its upper end to provide a shoulder 53 which receives the lower end of glass gauge tube 52, with O-rings 54 interposed between the exterior of tube 52 and the interior of nipple 51. Elongated elliptical windows 56 are cut on diametrically opposite sides of nipple 51 intermediate rings 54 to provide for visible inspection of the interior of the tube 52. Calibrations 57 are formed on the nipple 51 adjacent the window 56 so that the degree of opening of the valve may be observed as hereinafter appears in greater detail. Air inlet pipe 58 is connected to the upper end of nipple 51.

Reciprocable inside the body 21 is valve stem 61 having a valve head 62 at its lower end, the lower end of head 62 being formed with a taper 63. The portion of stem 61 above head 62 has a groove 75 to hold O-ring 74 to seal against piston bore 65 and is received inside piston 64 which reciprocates with the stem 61 inside body 21. In order to receive the stem 61, the piston 64 is formed with a bore 65. The exterior of piston 64 is recessed with a pair of grooves 66 at the top and bottom thereof receiving conventional O-rings 67 which bear against the interior wall of the body 21. Intermediate the grooves 66 the body of the piston 64 is relieved, as indicated by reference numeral 68, to reduce friction. The lower end of piston 64 provides a shoulder 69 against which the upper end of the valve head 62 is tightened. The top of piston 64 is formed with a counter-bore 70 in which is positioned washer 71 and head of screw 72 which is threaded into the upper end of stem 61. Upwardly projecting stem 73 on top of screw 72 extends into glass tube 52. By observation of the upper end of stem 73, the position of valve stem 61 and piston 64 may be observed.

Air entering through nipple 51 bears against the upper end 76 of the piston 64. Product entering through nipple 24 bears against the curved lower end 77 of the piston, as well as the tapered portion 63 of stem 61. When the pressure of the product entering through the product nipple 24 exceeds the pressure of the air entering through the air nipple 51, piston 64 and valve stem 61 are raised, thereby opening the valve and unseating tapered portion 63 from orifice 41. The height to which the valve is raised is observed through the gauge tube 52. If, for any reason, the pressure in product inlet pipe 26 should drop, the force of the air on the piston 64 closes the valve.

The valve as shown in Figs. 1 and 2 has change parts installed for substantially maximum flow of material through the valve. Accordingly, the diameter of orifice 41 is .625 inch and the angle between the central axis of throat 39 and its side wall is 5°12'. In addition, the angle between the central axis of taper 63 of stem 61 and the tapered surface of the stem is 31°24'. In Fig. 3 is shown how the flow characteristics of the valve may be changed by substituting a different bottom cap 28A and different stem 61A. In the modification shown in Fig. 3, the diameter of throat 41A is .250 inch and the angle between the central axis of throat 39A and the side wall thereof is 12°48'. The angle between the central axis of stem 61A and the tapered surface 63A is 9°54'. As is apparent from consideration of Fig. 3, the maximum flow through the valve when changed over as there indicated is substantially at a minimum.

Although the foregoing invention has been described in some detail by way of illustration and example for purposes of clarity of understanding, it is understood that certain changes and modifications may be practiced within the spirit of the invention and scope of the appended claims.

I claim:

1. A pressure relief valve comprising a body, an inlet conduit communicating with said body intermediate its ends, an outlet conduit communicating with said body at one end thereof, a pressure fluid conduit communicating with said body at the opposite end thereof, a sight glass in said pressure fluid conduit adjacent said body, a valve stem member reciprocable in said body with a tight fit and sealing said outlet and inlet conduits from any communication with said pressure fluid conduit, said stem member being moved toward the outlet conduit end by pressure in said pressure fluid conduit and toward the opposite end by pressure in said inlet conduit, a valve seat detachably positioned in the outlet conduit end of said body and cooperating with the adjacent portion of said stem member to close communication between said outlet and inlet conduits when pressure in said inlet conduit is more than a predetermined amount less than in said pressure fluid conduit, and a projection on said stem member extending into said pressure fluid conduit and having its end visible through said sight glass whereby the amount of opening of said valve may be gauged.

2. A pressure relief valve comprising a body formed of a straight sanitary pipe section open at both ends and having a smooth unobstructed bore, an inlet conduit formed of a smooth bore, unobstructed nipple communicating with said bore adjacent but spaced from an outlet end of said pipe section, the inner end of said nipple being ground flush with the interior bore of said pipe section, an outlet cap fitting inside said outlet end of said pipe section, said outlet cap being formed at its inner end with a valve seat, said outlet cap being formed at its outer end with an aperture communicating with said valve seat, means detachably sealing said outlet cap on said outlet end of said pipe section, an outlet conduit attached to said outlet cap, and communicating with the aperture in said outlet cap, an apertured second cap on the end of said pipe section opposite said outlet end, means detachably sealing said second cap on said pipe section, a pressure fluid conduit for supplying fluid under pressure to said second cap, a piston reciprocable inside said body between said inlet conduit and second cap and sealing said outlet and inlet conduits from any communication with said pressure fluid conduit, said piston having a central bore, a removable needle stem partially received in said central bore, and means sealing said stem in said central bore, a portion of said needle stem projecting beyond said piston in the direction of said valve seat, the outer end of said needle stem being shaped to conform to the shape of said valve seat, said piston being moved toward said outlet end by said fluid under pressure and toward the opposite end by pressure in said inlet conduit, said needle stem and valve seat cooperating to close off communication between said inlet conduit and said outlet conduit when pressure in said inlet conduit is more than a predetermined amount less than in said pressure fluid conduit, said body when said valve is disassembled being open at each end and unobstructed and of substantially the same diameter from end to end.

3. A valve according to claim 2 in which the end of said piston through which said needle stem projects is formed with a conoidal shape.

4. A valve according to claim 2 in which said seat is formed with an orifice and a smooth flow, convex entrance to said orifice, the outer edge of said seat merging with the interior of said body with no obstruction between said inlet conduit and said seat.

References Cited in the file of this patent

UNITED STATES PATENTS

| | | |
|---|---|---|
| 734,318 | McAuley | Mar. 31, 1903 |
| 813,008 | Kimis | Feb. 20, 1906 |
| 1,292,934 | Walmsley | Jan. 28, 1919 |
| 1,581,778 | Blomgren | Apr. 20, 1926 |
| 1,698,826 | Shaffer | Jan. 15, 1929 |
| 1,777,611 | Grohek | Oct. 7, 1930 |
| 2,051,509 | Wile | Aug. 18, 1936 |
| 2,261,364 | Grove | Nov. 4, 1941 |
| 2,557,785 | Du Four | June 19, 1951 |
| 2,567,892 | Osterman | Sept. 11, 1951 |
| 2,589,794 | Frantz | Mar. 18, 1952 |
| 2,596,368 | Brunton | May 13, 1952 |
| 2,634,754 | Rahn | Apr. 14, 1953 |
| 2,644,485 | Schwendner | July 7, 1953 |
| 2,717,004 | Page | Sept. 6, 1955 |

FOREIGN PATENTS

| | | |
|---|---|---|
| 11,363 | Denmark | Oct. 19, 1908 |